(12) United States Patent
Wirola et al.

(10) Patent No.: US 9,304,970 B2
(45) Date of Patent: Apr. 5, 2016

(54) EXTENDED FINGERPRINT GENERATION

(75) Inventors: Lauri Wirola, Tampere (FI); Jari Syrjarinne, Tampere (FI)

(73) Assignee: Nokia Technologies Oy, Espoo (FI)

( * ) Notice: Subject to any disclaimer, the term of this patent is extended or adjusted under 35 U.S.C. 154(b) by 698 days.

(21) Appl. No.: 13/697,604

(22) PCT Filed: May 19, 2010

(86) PCT No.: PCT/IB2010/052230
§ 371 (c)(1),
(2), (4) Date: Jan. 24, 2013

(87) PCT Pub. No.: WO2011/144967
PCT Pub. Date: Nov. 24, 2011

(65) Prior Publication Data
US 2013/0116968 A1    May 9, 2013

(51) Int. Cl.
*G06F 19/00* (2011.01)
*G06F 17/00* (2006.01)
*G01S 5/02* (2010.01)
*H04W 64/00* (2009.01)

(52) U.S. Cl.
CPC .............. *G06F 17/00* (2013.01); *G01S 5/0252* (2013.01); *G01S 5/0263* (2013.01); *H04W 64/00* (2013.01)

(58) Field of Classification Search
CPC ... G08B 19/005; G08B 25/008; G08B 27/003
USPC .................. 702/150, 151, 155, 182–185, 188
See application file for complete search history.

(56) References Cited

U.S. PATENT DOCUMENTS

| | | | |
|---|---|---|---|
| 5,959,575 | A | 9/1999 | Abbott |
| 6,009,359 | A | 12/1999 | El-Hakim et al. |
| 6,349,249 | B1 | 2/2002 | Cunningham |
| 6,608,913 | B1 | 8/2003 | Hinton et al. |
| 6,711,475 | B2 | 3/2004 | Murphy |
| 6,807,478 | B2 | 10/2004 | Giannopoulos et al. |
| 6,917,893 | B2 | 7/2005 | Dietsch et al. |
| 7,302,359 | B2 | 11/2007 | McKetterick |
| 8,350,758 | B1 | 1/2013 | Parvizi et al. |

(Continued)

FOREIGN PATENT DOCUMENTS

| | | |
|---|---|---|
| CN | 1981206 A | 6/2007 |
| CN | 101018402 A | 8/2007 |

(Continued)

OTHER PUBLICATIONS

International Search Report for International Application Serial No. PCT/IB2010/052229, Date of Mailing: Mar. 15, 2011, 6 pages.

(Continued)

*Primary Examiner* — Edward Raymond
(74) *Attorney, Agent, or Firm* — Locke Lord LLP

(57) ABSTRACT

A system for creating a representation of a location based on information sensed at the location. For example, apparatuses may comprise various sensors that sense apparatus-related information (e.g., motion, direction, etc.) while also visual, signal, field, etc. information pertaining to a location. Apparatuses may store sensed information about the apparatus while at a particular location, and about the particular location itself, in a mapping database, which may then associate the various types of sensed information with information already stored in the database in order to create a representation of the location.

21 Claims, 11 Drawing Sheets

(56) References Cited

U.S. PATENT DOCUMENTS

| | | |
|---|---|---|
| 8,463,018 B2 | 6/2013 | Chung et al. |
| 2004/0189517 A1 | 9/2004 | Pande et al. |
| 2007/0001904 A1 | 1/2007 | Mendelson |
| 2007/0026870 A1 | 2/2007 | Spain et al. |
| 2007/0149216 A1 | 6/2007 | Misikangas |
| 2007/0271011 A1 | 11/2007 | Lee et al. |
| 2008/0033645 A1 | 2/2008 | Levinson et al. |
| 2008/0153516 A1 | 6/2008 | Hsieh |
| 2009/0043440 A1 | 2/2009 | Matsukawa et al. |
| 2009/0262974 A1 | 10/2009 | Lithopoulos |
| 2010/0106745 A1 | 4/2010 | Cho et al. |
| 2010/0121488 A1 | 5/2010 | Lee et al. |
| 2010/0123737 A1 | 5/2010 | Williamson et al. |
| 2010/0189312 A1 | 7/2010 | Nielsen et al. |
| 2011/0081919 A1 | 4/2011 | Das et al. |
| 2011/0199259 A1 | 8/2011 | Karaoguz et al. |

FOREIGN PATENT DOCUMENTS

| | | |
|---|---|---|
| CN | 101032183 A | 9/2007 |
| CN | 101046378 A | 10/2007 |
| CN | 101098543 A | 1/2008 |
| JP | 2007205948 | 8/2007 |

OTHER PUBLICATIONS

English Language Machine Translation of Japanese Patent Publication No. JP2007205948, 64 pages.

English Language Machine Translation of Chinese Patent Publication No. CN101018402A, 24 pages.

Sato, T. et al, "Camera Position and Posture Estimation from a Still Image Using Feature Landmark Database", SICE Annual Conference 2008, Aug. 20-22, The University Electro-Communications, Japan, pp. 1514-1519.

Gu, Y. et al., "A Survey of Indoor Positioning Systems for Wireless Personal Networks," IEEE Communications Surveys & Tutorials, vol. 11, No. 1, First Quarter 2009, pp. 13-32.

International Search Report for International Application Serial No. PCT/IB2010/052231, Date of Mailing: Feb. 21, 2011, 6 pages.

Written Opinion of the International Searching Authority for International Application Serial No. PCT/IB2010/052231, Date of Mailing: Feb. 21, 2011, 6 pages.

English Language Machine Translation of Chinese Patent Publication No. CN101046378A, 7 pages.

Written Opinion of the International Searching Authority for International Application Serial No. PCT/IB2010/052229, Date of Mailing: Mar. 15, 2011, 7 pages.

Klingbeil L. et al., "Multi modal Sensor Data and Information Fusion for Localization in Indoor Environments", 2010 7th Workshop on Positioning Navigation and Communication, IEEE, Mar. 11-12, 2010, Dresden, Germany, ISBN 978-1-4244-7158-4, pp. 187-192.

International Search Report for International Application Serial No. PCT/IB2010/052230, Date of Mailing: Feb. 21, 2011, 6 pages.

Written Opinion of the International Searching Authority for International Application Serial No. PCT/IB2010/052230, Date of Mailing: Feb. 21, 2011, 7 pages.

English Language Machine Translation of Chinese Patent Publication No. CN101032183A, 14 pages.

English Language Machine Translation of Chinese Patent Publication No. CN101098543A, 7 pages.

English Language Machine Translation of Chinese Patent Publication No. CN1981206A, 8 pages.

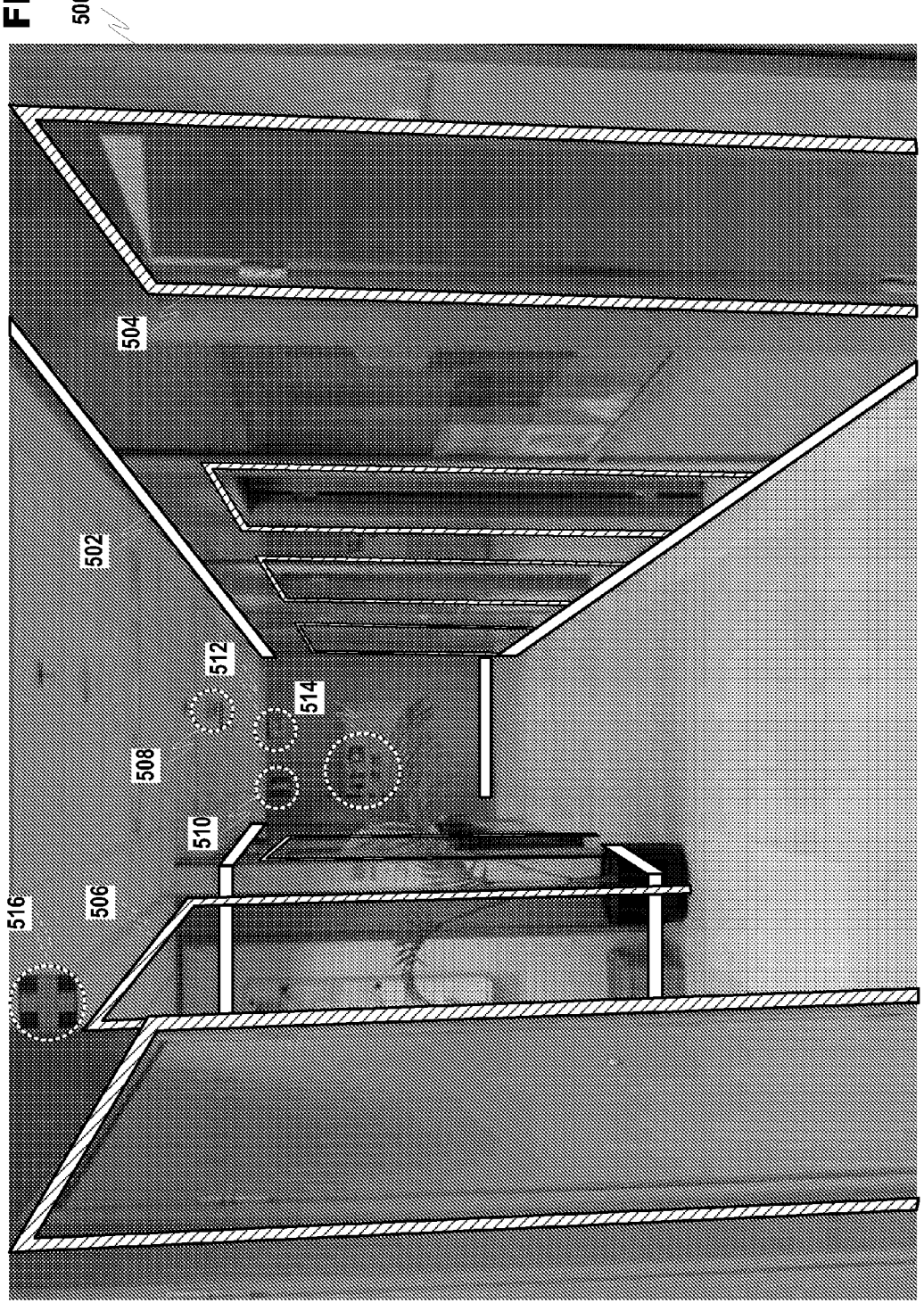

EXTENDED FINGERPRINT GENERATION

BACKGROUND

1. Field of Invention

The present invention relates to electronic positioning, and in particular, to facilitating location determination through the use of previously stored sensor information.

2. Background

Wireless functionality continues to proliferate in modern society. User demand has driven developers to not only create new wireless-enabled apparatuses, but also to implement wireless functionality in existing applications that did not originally provide this ability. Further, the advent of flexible platforms has increased the product offering, and likewise, has increased user demand. Wireless functionality is no longer limited to audible communication (e.g., voice), but may be implemented in support of various applications that require the conveyance of data.

At least one communication-related application currently being offered in various forms is electronic positioning. Basic electronic positioning may provide the current location of an apparatus in terms of coordinates, in relation to visual presentation (e.g., map), etc. However, the means by which the raw positioning information is obtained may vary. Apparatus offerings may include the incorporation of Global Positioning System (GPS) receivers for obtaining the electronic positioning information from satellites. Further, long range wireless communication systems (e.g., cellular) may also provide electronic positioning information through methods such as cell-based triangulation, etc., while short-range wireless systems may be able to provide similar information through determination of proximity to a particular wireless access point, etc.

Electronic positioning in the out-of-doors may provide adequate performance for users because, in addition to electronic positioning information being readily available for quick position resolution, frequently updated maps may be available for most populated regions. The same conditions do not exist within structures (e.g., buildings). Accurate map information, or even any map information at all, may not be available and electronic positioning signals may not be dependable based on prevalent interference. As a result, position resolution within a structure may be very slow, if even available, and may be lack the accuracy required to be effective.

SUMMARY

Example embodiments of the present invention may be directed to a method, computer program product, apparatus and system for creating a representation of a location based on instances of sensed information recorded over time. For example, an apparatus may comprise resources for sensing apparatus-related information and location-related information. These resources may be activated at an instance in time in order to sense and record information. The recorded information may be correlated in view of time information, and the correlated information may further be stored in association with stored correlated information corresponding to previous instances in time.

In accordance with at least one embodiment of the present invention, an extended fingerprint for a location may comprise information pertaining to the location captured at multiple instances in time. Apparatuses may sense information each of the instances in time, may correlate the information and then may store in the information in association with previous instances. Sensed apparatus-related information may comprise information captured regarding apparatus motion, direction, acceleration, etc. Location-related information may comprise visual, signal, etc. field location captured at a location. Information sensing may be triggered in an apparatus in accordance with periodic timing, a change in sensed information, through manual intervention, etc., and as a result sensors in the apparatus may sense and record information at the current instance in time.

The information sensed at the time instance and recorded in the apparatus may then be processed and/or correlated. For example, visual information sensed by an apparatus may be video and/or still image information sensed by a camera. One or more visual elements may be extracted from the visual information. Further, any motion information captured at the instance of time may be evaluated in view of time information derived from the time instance in order to calculated dimensions. Calculated dimensions may then be utilized along with the sensed signal and/or field information in order to impart properties to the one or more extracted visual elements such as orientation, dimension, position, etc. The correlated information may then be stored, for example in accordance with an extended fingerprint corresponding to the location, in association with correlated information corresponding to previous time instances. Time instances may be associated based on at least the visual element information in the correlated information.

The foregoing summary includes example embodiments of the present invention that are not intended to be limiting. The above embodiments are used merely to explain selected aspects or steps that may be utilized in implementations of the present invention. However, it is readily apparent that one or more aspects, or steps, pertaining to an example embodiment can be combined with one or more aspects, or steps, of other embodiments to create new embodiments still within the scope of the present invention. Therefore, persons of ordinary skill in the art would appreciate that various embodiments of the present invention may incorporate aspects from other embodiments, or may be implemented in combination with other embodiments.

DESCRIPTION OF DRAWINGS

The invention will be further understood from the following description of various example embodiments, taken in conjunction with appended drawings, in which:

FIG. 5B discloses example element definition within the visual information in accordance with at least one embodiment of the present invention.

DESCRIPTION OF EXAMPLE EMBODIMENTS

Figure 1:
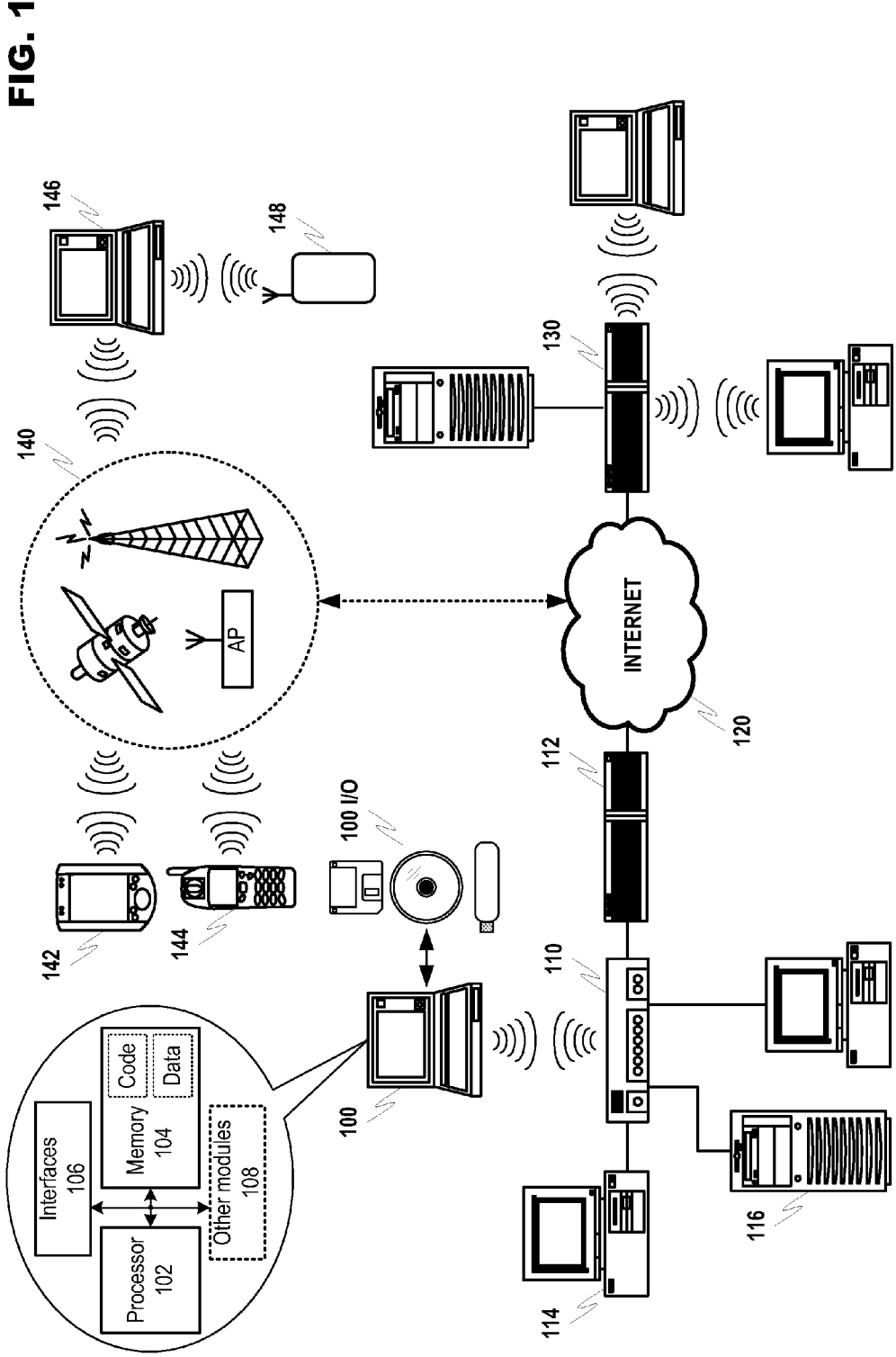
FIG. 1 discloses example apparatuses, communication configuration and network architecture usable in implementing at least one embodiment of the present invention.

While the invention has been described below in terms of a multitude of example embodiments, various changes can be made therein without departing from the spirit and scope of the invention, as described in the appended claims.

I. Example System with which Embodiments of the Present Invention May be Implemented An example of a system that is usable for implementing various embodiments of the present invention is disclosed in FIG. 1. The system comprises elements that may be included in, or omitted from, configurations depending, for example, on the requirements of a particular application, and therefore, is not intended to limit present invention in any manner.

Computing device 100 may correspond to various processing-enabled apparatuses including, but not limited to, micro personal computers (UMPC), netbooks, laptop computers, desktop computers, engineering workstations, personal digital assistants (PDA), computerized watches, wired or wireless terminals/nodes/etc., mobile handsets, set-top boxes, personal video recorders (PVR), automatic teller machines (ATM), game consoles, or the like. Elements that represent basic example components comprising functional elements in computing device 100 are disclosed at 102-108. Processor 102 may include one or more devices configured to execute instructions. In at least one scenario, the execution of program code (e.g., groups of computer-executable instructions stored in a memory) by processor 102 may cause computing device 100 to perform processes including, for example, method steps that may result in data, events or other output activities. Processor 102 may be a dedicated (e.g., monolithic) microprocessor device, or may be part of a composite device such as an ASIC, gate array, multi-chip module (MCM), etc.

Processor 102 may be electronically coupled to other functional components in computing device 100 via a wired or wireless bus. For example, processor 102 may access memory 104 in order to obtain stored information (e.g., program code, data, etc.) for use during processing. Memory 104 may generally include removable or imbedded memories that operate in a static or dynamic mode. Further, memory 104 may include read only memories (ROM), random access memories (RAM), and rewritable memories such as Flash, EPROM, etc. Examples of removable storage media based on magnetic, electronic and/or optical technologies are shown at 100 I/O in FIG. 1, and may serve, for instance, as a data input/output means. Code may include any interpreted or compiled computer language including computer-executable instructions. The code and/or data may be used to create software modules such as operating systems, communication utilities, user interfaces, more specialized program modules, etc.

One or more interfaces 106 may also be coupled to various components in computing device 100. These interfaces may allow for inter-apparatus communication (e.g., a software or protocol interface), apparatus-to-apparatus communication (e.g., a wired or wireless communication interface) and even apparatus to user communication (e.g., a user interface). These interfaces allow components within computing device 100, other apparatuses and users to interact with computing device 100. Further, interfaces 106 may communicate machine-readable data, such as electronic, magnetic or optical signals embodied on a computer readable medium, or may translate the actions of users into activity that may be understood by computing device 100 (e.g., typing on a keyboard, speaking into the receiver of a cellular handset, touching an icon on a touch screen device, etc.) Interfaces 106 may further allow processor 102 and/or memory 104 to interact with other modules 108. For example, other modules 108 may comprise one or more components supporting more specialized functionality provided by computing device 100.

Computing device 100 may interact with other apparatuses via various networks as further shown in FIG. 1. For example, hub 110 may provide wired and/or wireless support to devices such as computer 114 and server 116. Hub 110 may be further coupled to router 112 that allows devices on the local area network (LAN) to interact with devices on a wide area network (WAN, such as Internet 120). In such a scenario, another router 130 may transmit information to, and receive information from, router 112 so that devices on each LAN may communicate. Further, all of the components depicted in this example configuration are not necessary for implementation of the present invention. For example, in the LAN serviced by router 130 no additional hub is needed since this functionality may be supported by the router.

Further, interaction with remote devices may be supported by various providers of short and long range wireless communication 140. These providers may use, for example, long range terrestrial-based cellular systems and satellite communication, and/or short-range wireless access points in order to provide a wireless connection to Internet 120. For example, personal digital assistant (PDA) 142 and cellular handset 144 may communicate with computing device 100 via an Internet connection provided by a provider of wireless communication 140. Similar functionality may be included in devices, such as laptop computer 146, in the form of hardware and/or software resources configured to allow short and/or long range wireless communication. Further, any or all of the disclosed apparatuses may engage in direct interaction, such as in the short-range wireless interaction shown between laptop 146 and wireless-enabled apparatus 148. Example wireless enabled apparatuses 148 may range from more complex standalone wireless-enabled devices to peripheral devices for supporting functionality in apparatuses like laptop 146.

Figure 2:
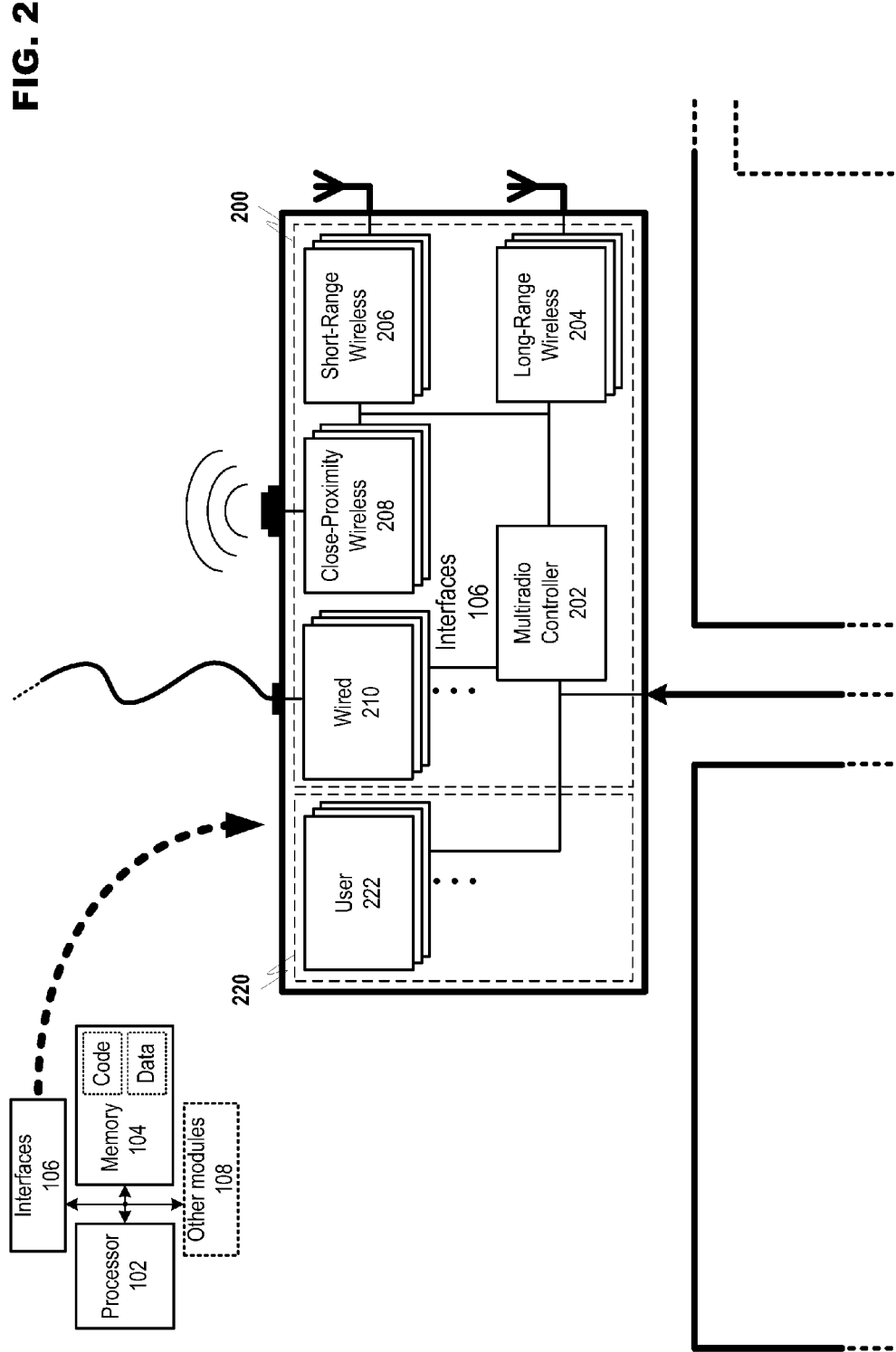
FIG. 2 discloses additional detail with respect to example communication interfaces usable with at least one embodiment of the present invention.

Further detail regarding example interface component 106, shown with respect to computing device 100 in FIG. 1, is now discussed with respect to FIG. 2. Initially, interfaces such as disclosed at 106 are not limited to use only with computing device 100, which is utilized herein only for the sake of explanation. As a result, interface features may be implemented in any of the apparatuses that are disclosed in FIG. 1 (e.g., 142, 144, etc.) As previously set forth, interfaces 106 may include interfaces both for communicating data to computing apparatus 100 (e.g., as identified at 200) and other types of interfaces 220 including, for example, user interface 222. A representative group of apparatus-level interfaces is disclosed at 200. For example, multiradio controller 202 may manage the interoperation of long range wireless interfaces 204 (e.g., cellular voice and data networks), short-range wireless interfaces 206 (e.g., Bluetooth and WLAN networks), close-proximity wireless interfaces 208 (e.g., for interactions where electronic, magnetic, electromagnetic and optical information scanners interpret machine-readable data), wired interfaces 210 (e.g., Ethernet), etc. The example interfaces shown in FIG. 2 have been presented only for the sake of explanation herein, and thus, are not intended to limit the various embodiments of the present invention to utilization of any particular interface. Embodiments of the present invention may also utilize interfaces that are not specifically identified in FIG. 2.

Multiradio controller 202 may manage the operation of some or all of interfaces 204-210. For example, multiradio controller 202 may prevent interfaces that could interfere with each other from operating at the same time by allocating specific time periods during which each interface is permitted to operate. Further, multiradio controller 202 may be able to process environmental information, such as sensed interference in the operational environment, to select an interface that will be more resilient to the interference. These multiradio control scenarios are not meant to encompass an exhaustive list of possible control functionality, but are merely given as examples of how multiradio controller 202 may interact with interfaces 204-210 in FIG. 2.

Figure 3:
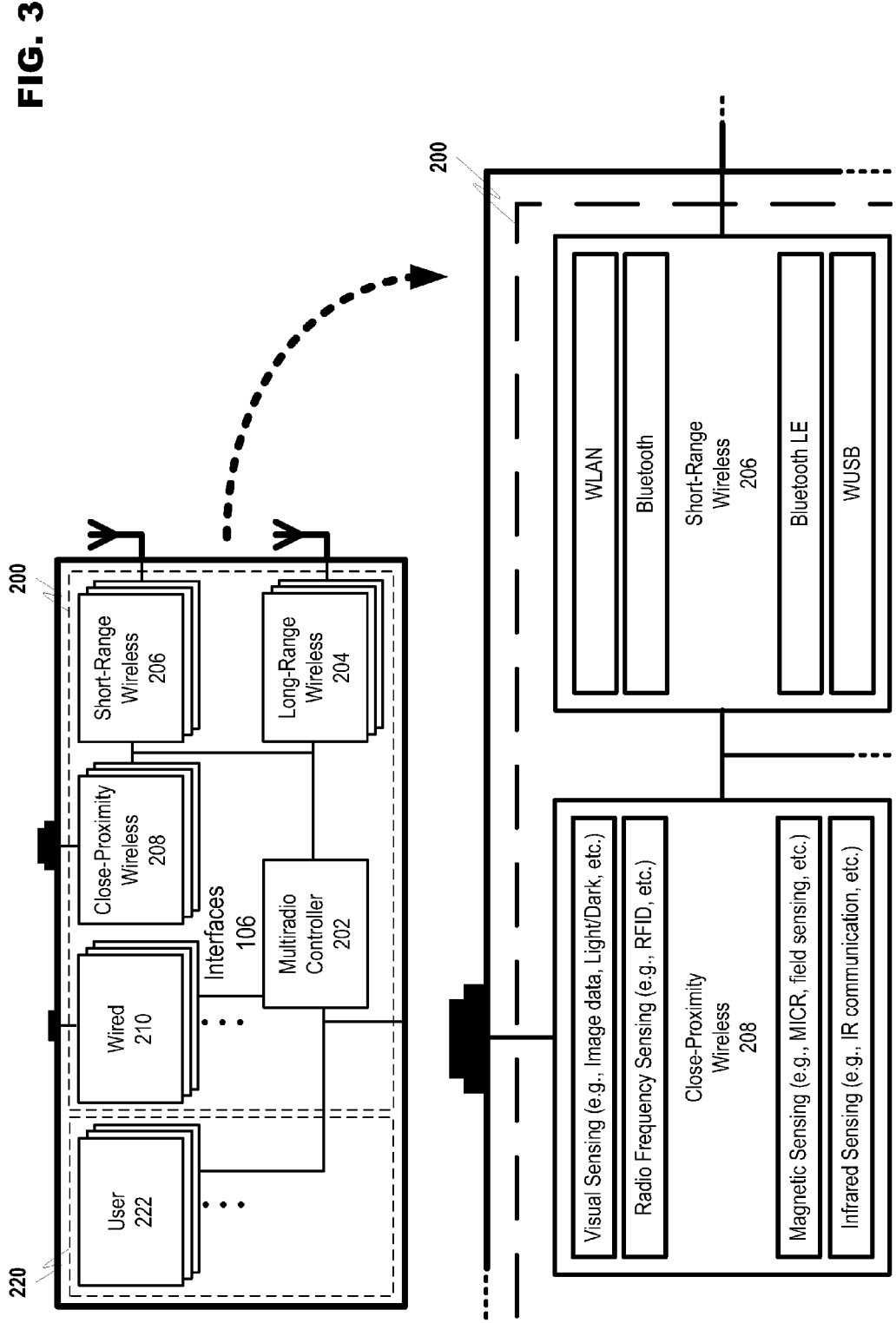
FIG. 3 discloses additional detail with respect to example close proximity and short range wireless resources usable with at least one embodiment of the present invention.

The example communication interface configuration 106 disclosed in FIG. 2 may, in accordance with at least one embodiment of the present invention, further comprise example close-proximity wireless interfaces 208 such as set forth in FIG. 3. Resources for visual sensing may comprise at least a camera or similar sensor device capable of recording moving and/or still image data, light/dark data, color data, etc. Other examples of close-proximity sensing interfaces that may be incorporated in apparatuses may include, but are not limited to, radio frequency (RF) transceivers for communicating data such as radio frequency identification (RFID) information, magnetic sensors for magnetic ink character recognition (MICR), magnetic field detection, etc., and infrared (IR) transmitters/receivers for communicating IR information over short distances.

Moreover, example short-range wireless interface 206 may comprise hardware and/or software resources for supporting various forms of short-range wireless communication. Examples of wireless communication that may be supported by interface 206 may include, but are not limited to, wireless local-area networking (WLAN), Bluetooth communication, Bluetooth Low Energy communication, wireless Universal Serial Bus (WUSB) communication, etc. These forms of communication may, in various applications, support wireless interaction between two or more handheld wireless communication devices, between a handheld wireless communication device and a stationary access point (AP), to peripheral interface devices, etc.

II. Example Operational Environment

Assisted global positioning (A-GPS) and other electronic positioning solutions based on wireless communication may perform acceptably and may provide extensive coverage outdoors where the signal quality and number of satellites/base stations are typically very good. This performance may be bolstered by accurate maps featuring terrain features, roads, traffic conditions and other related information have been mapped exhaustively and are constantly maintained from satellite images, aerial photography, feedback from user communities, etc. Together, the available positioning solutions and the feature-rich maps may provide excellent user experiences (e.g., such as in instances including vehicle and pedestrian navigation use).

The situation becomes totally different when the navigation is brought indoors. Known positioning technologies have very limited capabilities indoors, and thus, usually fail. There are many reasons for these failures. Initially, existing positioning/mapping solutions may be expensive and difficult to implement. Map information does not exist for many public/private structures, and the provision of this information requires extensive modeling visualization and/or mapping that is currently only provided by private companies. Further, existing solutions may provide unstable and/or unpredictable performance, which may occur to do external positioning signals being unavailable or unreliable and indoor signals lacking sufficient position resolution.

The various embodiments of the present invention may provide a means for faster and more accurate position determination in scenarios where traditional positioning techniques may be unavailable or inadequate. An example of a problematic situation is providing electronic positioning within a structure such as a building. While positioning within a building will be utilized for the sake of explanation herein, the various embodiments of the present invention are not limited only to use in this specific application. Almost any situation where traditional positioning techniques do not provide adequate performance (e.g., speed, resolution, etc.) may experience improvement through the following example embodiments and/or implementations of the present invention.

Figure 4:
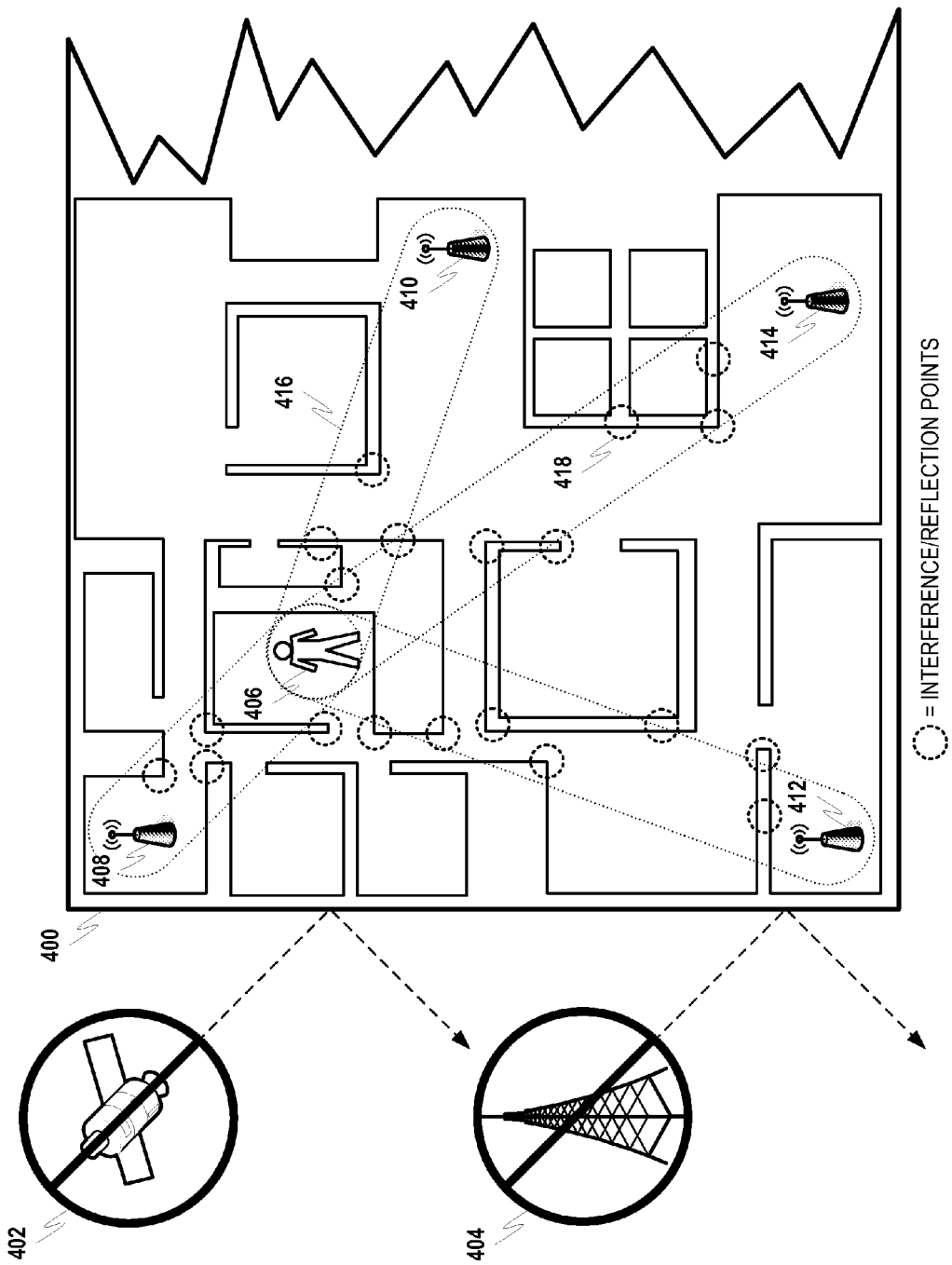
FIG. 4 discloses an example operational environment and the challenges presented therein in accordance with at least one embodiment of the present invention.

Partial floor plan 400 disclosed in FIG. 4 will help to explain various challenges to traditional electronic positioning that may be experienced within a structure (e.g., building). Information received from satellites 402 and long-range transmission 404 (e.g., cellular) may be effective when outside where these signals may be efficiently received. However, structures may present physical obstacles that significantly reflect, or totally block, such signals as shown in FIG. 4. User 406 may then have to rely on wireless electronic communication provided within a building in order to electronically determine position. For example, wireless access points (AP) 408, 410, 412 and 414 may provide electronic wireless communication as shown in floor plan 400. In additional to simply providing data communication (e.g., access to the LAN or WAN resources such as the Internet). These access points may also provide positioning information. Various methods for determining position may be employed, each with differing amounts of accuracy. For example, connection 416 to a particular AP (e.g., AP 408) indicates that user 410 is within communication range of that AP. However, the resolution provided by such an estimation is extremely inexact, especially within the smaller confines of a building.

Further, signals from various access points may be utilized for various position finding algorithms. For example location triangulation based on connection to more than one AP or direct-of-arrival (DoA) estimation in order to determine the relative direction from a receiver towards the emitter of a signal may be employed. However, the various signals 416 emitted by AP 408-414 may experience substantial interference/reflection points 418 within a building or structure. For example, walls containing metallic conduits, hallways containing various corners and other objects, elevator shafts and other high power equipment may cause signal interference or reflection 418. Interference/reflection points 418 may result in AP signals 416 being delayed significantly, or not being received at all. Further, these signals may be received from directions that do not indicate the actual direction from which the signal was originally sent, and thus, may cause delays or inaccuracy when employing these traditional position finding techniques.

III. Example Extended Fingerprints

In accordance with at least one embodiment of the present invention, a solution that is both scalable and global is disclosed for providing electronic positioning functionality in situations that may be problematic for existing positioning and/or mapping systems. Electronic positioning/mapping may be based on "crowd-sourced" information that may comprise, for example, location-related information that is collected by users and that is voluntarily provided for positioning/mapping purposes. The crowd-sourced information may further be considered "sensor-surveyed" in that the information may be recorded by sensors in user apparatuses. At least some of the sensed information may then be stored in one or more databases as "extended fingerprints" that may comprise elements extracted from the sensed information that are usable for positioning/mapping. For example, extended fingerprints may comprise visual landmarks extracted from images or video streams captured at a location. In some implementations extended fingerprints may also include other location-related information, such as radio and/or motion sensor data, that may be usable in ambiguity removal that may occur when combining extended fingerprints into a representative mapping database. The mapping database may then be utilized as a source for physically-constrained radio maps that enable efficient use of vision sensors alone or in combination with global navigation satellite systems (GNSS), cellular and/or short-range wireless communication and motion sensors for indoor navigation generated either locally in the user apparatus or collectively with mapping servers in wireless communication.

Physically-constrained radio maps are not analogous to indoor maps as they may be understood in the art. Physically-constrained radio maps may comprise a collection of features (e.g., building and/or internal structure characteristics) that may be beneficial for more accurate 2D/3D apparatus positioning, not features that are valuable/meaningful to enhancing the user interface of the apparatus (e.g., to enhancing the presentation of a map that reflects the current position of an apparatus). Thus, indoor map data is directed to improved location visualization (e.g., displaying building maps and their interiors to users, routing information for the navigation etc.). This map data does not (necessarily) have the same format nor the same visual attributes or the links to other sources of location information than the physically-constrained radio map.

Extended fingerprints should not be thought of as containing full visual images of locations, but as collections of representative 2D/3D physical elements and attributes such as walls, roofs, colors, window and door positions, exit signs, WLAN AP positions etc. More specifically, these visual elements are not generic frequency domain features obtained from a single image or from a video stream by, for example, Scale-Invariant Feature Transform (SIFT). They may also be combined with RF environment (e.g., WLAN/CI AP, RSSI) measurements, relative scale and orientation (e.g. compass) measurements used to refine element placement.

In at least one example implementation, it may also be possible to rely on user interaction to fix the orientation of visual elements contained in the extended fingerprint, to add other relevant information and attributes such as level, address, etc., and to manually edit the extracted attributed/ features e.g. using a predefined object library. These actions may help to further refine the location approximation provided by the positioning system. Further, visual information contained in extended fingerprints does not necessarily include the following items to avoid privacy violation issues: the actual raw image, the faces of persons that may have been present when the image was created and audio information that may have been recorded when the image was created. Extended fingerprint information may be recorded in mapping databases. Mapping databases may comprise a local or remote information storage location where extended fingerprints or a series of extended fingerprint may be collected from contributing terminals. It is also possible for mapping databases to store multiple extended fingerprints representative of the same location (e.g., feature map) which may be constantly updated/upgraded based on inputs received from contributing apparatuses.

IV. Example Visual Element Capture and Processing for Extended Fingerprints

While the following disclosure focuses on visual information capture and processing in order to define visual elements existing within the visual information, visual information is just one example of sensed information that may be stored in an extended fingerprint. As discussed further with respect to ambiguity removal, other forms of sensed information may be captured at a location and stored in association with an extended fingerprint.

Figure 5A:
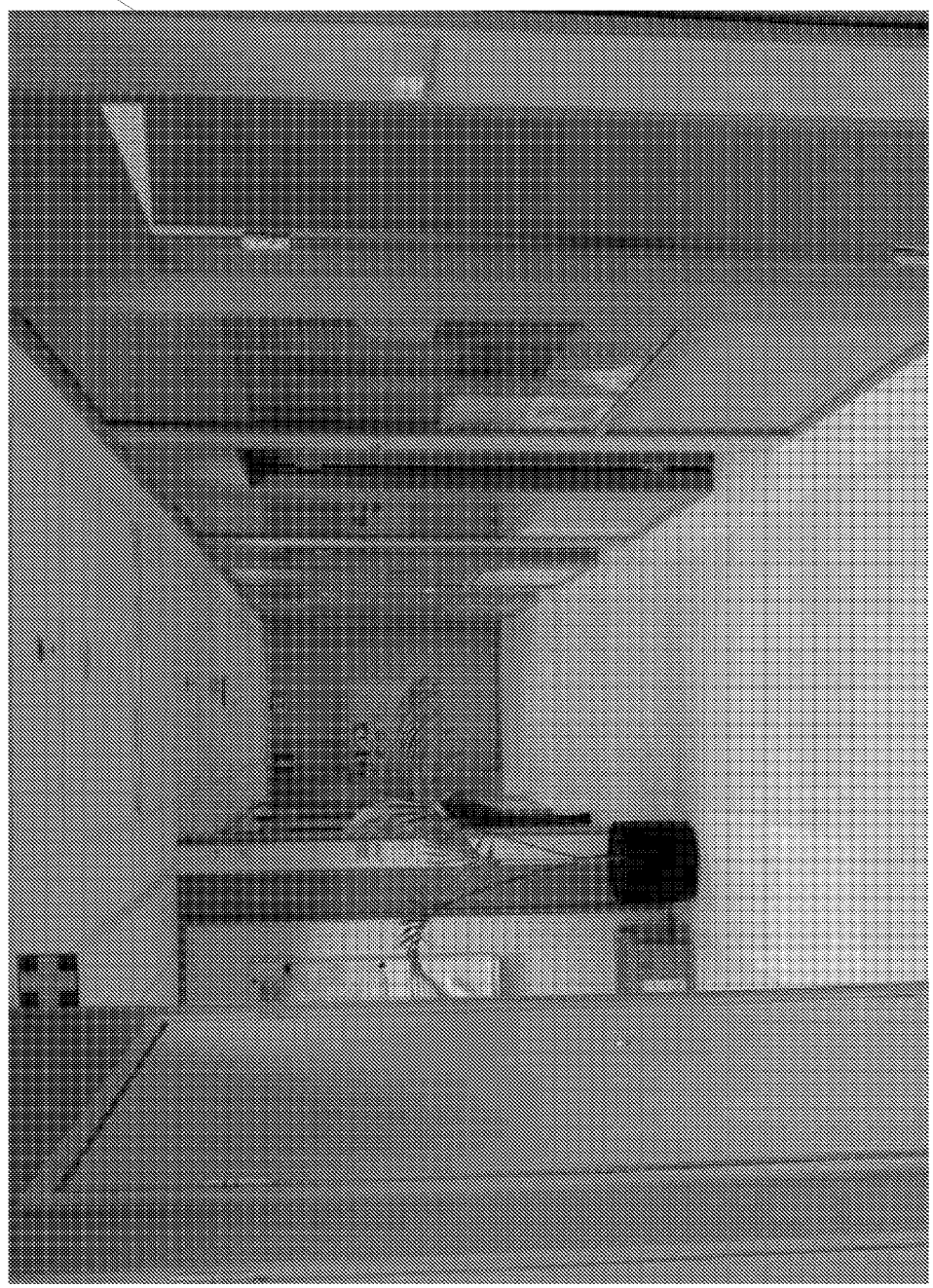
FIG. 5A discloses example visual information in accordance with at least one embodiment of the present invention.

Visual element information contained in extended fingerprints may be obtained manually or automatically from vision sensors in participating apparatuses. Example vision sensors may include, but are not limited to, cameras, video cameras or stereo-cameras that may generate continuous location fixes either by determining the location of the user of the images or measuring the motion from the stream of images (video) or stream of elements extracted from the images/videos. An example of visual information is disclosed in FIG. 5A at 500. While image information 500 is a picture of a building hallway, various embodiments of the present invention are not limited only to use in such an area. The example discloses a typical hallway that might be found in an office building, and thus, includes features that would be found in a typical office building hallway.

Now referring to FIG. 5B, an example of element extraction from a single image is disclosed. The visual sensor (in this case camera) may capture images while users walk and/or navigate indoors. The user may be further using the apparatus in a "see-through" fashion, where the indoor map may be superimposed on the screen, and feature extraction may then proceed in the following manner. Initially, a two dimensional (2-D) or three dimensional (3-D) layout may be extracted by projecting dimensional limitation elements from the image/ video stream to an empty "canvas" or floor plan. The layout dimensions for the hallways in visual information are disclosed by solid white lines 502 in FIG. 5B. Next, doors, open areas, staircases, windows may be defined in visual information 500. Doors 504 and open areas 506 (e.g., intersecting hallway openings) are defined in visual image information 500 by upper left to lower right crosshatching. The aforementioned opening definition may further comprise defining/ measuring the scale (e.g. from height of a door, intersecting hallway, etc.) of the elements that are identified in the visual information. The defining/measuring may, for example, be based on known values in the image information, such as the height of a ceiling, dimensions of doors, height of people, etc. Further element definition may comprise the identification of additional attributes in the visual information. These attributes may comprise signage (e.g., exit signs 512 and emergency signs 514), fire extinguishers 510 and other emergency related aspects 516, wall color and/or markings, wall and ceiling attributes such as light switches, WLAN AP antennas, etc.

Further, element definition may further comprise locating access points such as disclosed at 508. Access point definition may help to tie the visual location to actual location with respect to distance from the access point. Thus, in instances where corresponding element information is not readily identifiable in a mapping database, information such as location with respect to an access point may help resolve corresponding elements. In some instances, the identification and definition of an access point within visual information may prompt the apparatus that captured the image information to also performing sensing for signals from the access point. In this manner, position information (e.g., either absolute or relative with respect to the access point) may be obtained and recorded along with visual image information 500.

Figure 6:
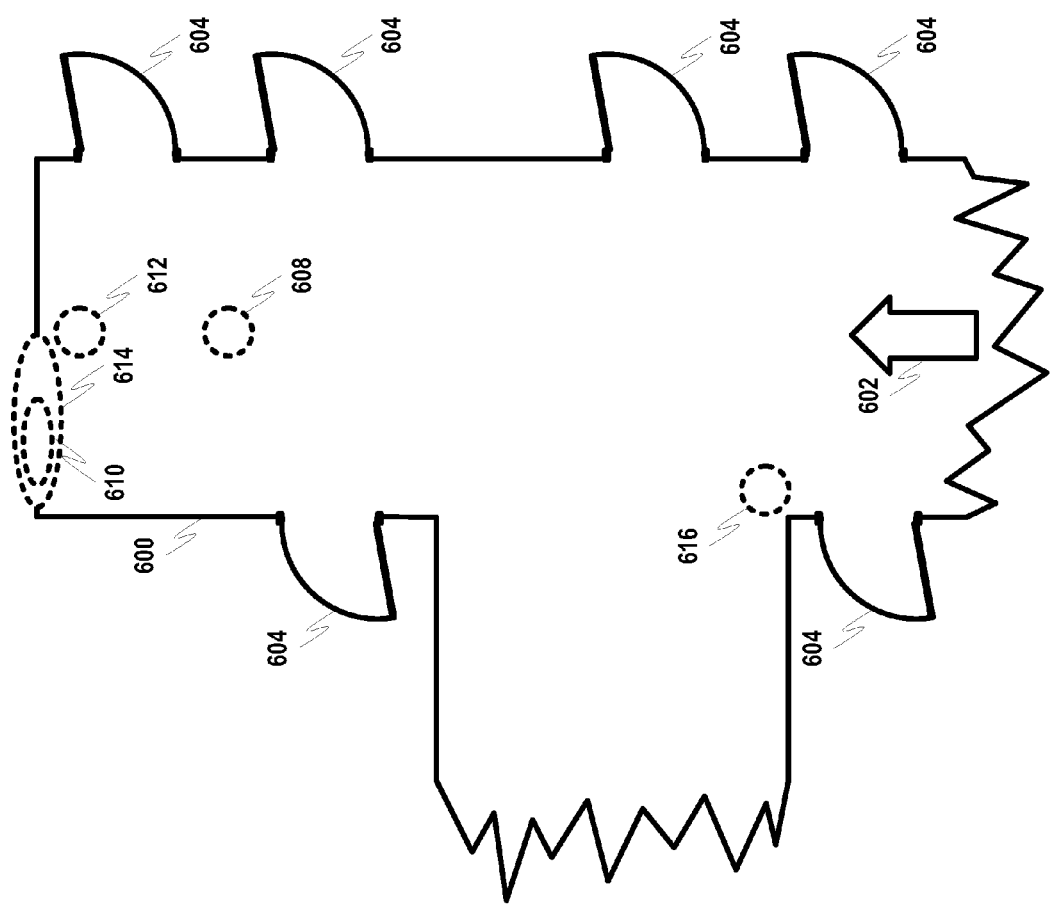
FIG. 6 discloses an example representation of a location based on visual information in accordance with at least one embodiment of the present invention.

The features extracted from the image (e.g., defined in the extended fingerprint) may be organized such as set forth in FIG. 6. As can be seen the extended fingerprint may not be usable as an indoor map by itself, as it is limited to the visual range of the sensor at the time the image was recorded (e.g., does not see through the walls or behind the doors), but it is extremely useful for positioning and making the visual sensor and useful source for location information. Extended fingerprint 600 may comprise some or all of the features that were defined in FIG. 5B. For example, extended fingerprint 600 may comprise hallway dimensions based on dimensions 502, may have doors 604 based upon defined door openings 504. Further, the representation may indicate the presence of access point 608 based on the defined location 508, and may comprise various signage or other objects 610-616 based on the definitions 510-516 made in visual image 500. Further, the representation may comprise information 602 that identifies the direction from, and possibly even the actual position of, the apparatus when the image information was captured. In accordance with at least one embodiment of the present invention, image information 500, or video streams, etc., may not be transmitted to a mapping server in their original captured form, but only the extracted features/attributes may be sent. Providing extracted feature/attribute information to mapping servers not only conserves space by reducing the amount of data to be stored in mapping databases, but may also avoid privacy issues in that no sensitive or private image information may be transmitted to, or stored on, mapping servers.

At least one important aspect of vision and sensor-surveyed mapping database generation is crowd-sourcing. An advantageous implementation of database generation is to integrate "harvesting" of extended fingerprint information with the protocols and software of already-implemented frameworks (e.g., frameworks for WiFi/cellular-ID data collection). As in at least one example implementation extended fingerprint information does not carry the actual images (only data relevant for the indoor navigation), any privacy-related issues may be avoided.

Figure 7:
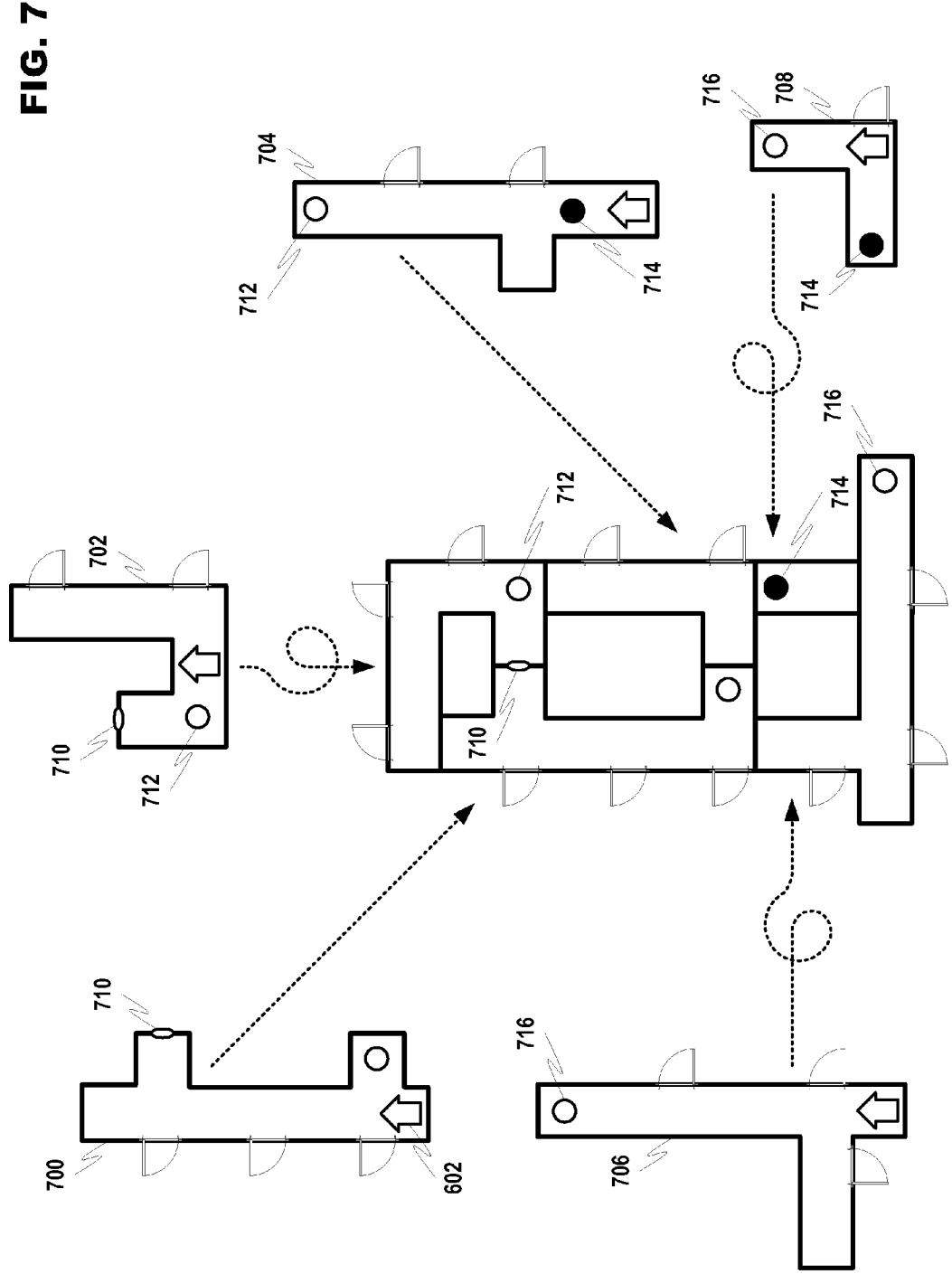
FIG. 7 discloses an example of creating a representative map of a location based on visual information in accordance with at least one embodiment of the present invention.

In accordance with at least one embodiment of the present invention, extended fingerprints may be stored and then assembled into a representation of a larger area (e.g., into a physically-constrained radio map. FIG. 7 discloses an example of a floor plan being generated based on individual extended fingerprints. The mapping system may retrieve extended fingerprints from various sources (e.g., user apparatuses, building cameras, etc.) and may combine them to form mapping databases. In FIG. 7 individual extended fingerprints 700, 702, 704, 706 and 708 may each have been recorded from perspective indicated in each extended fingerprint by arrow 602. In particular, the apparatus that recorded each extended fingerprint may have been in located in the relative position indicated by arrow 602, and the visual sensor (e.g., camera) in the apparatus may have been pointing in the direction in which each arrow 602 is pointing. The individual extended fingerprints may be combined together based on common elements. For example, element 710 may exist at a hallway intersection between extended fingerprints 700 and 702. Similarly, element 712 may exist in both extended fingerprints 702 and 704, element 714 may exist in both extended fingerprints 704 and 708, and element 716 may exist in both extended fingerprints 706 and 708. These common elements may help to "reassemble" the extended fingerprints, and be used to associate these extended fingerprints in the mapping database.

It is evident in the example of FIG. 7 that the perspective indicated by arrow 602, from which each extended fingerprint was recorded, may not facilitate the "direct" association of the individual extended fingerprints into the whole. This may occur because there is no limitation or standard that controls the direction or orientation from which the extended fingerprints are recorded. Thus, as shown with respect to extended fingerprints 702, 706 and 708, the processing device (e.g., the recording apparatus or a remote entity like the mapping database) may have to reorient the extended fingerprint before elements within the extended fingerprint may be associated with the same elements that were already recorded in the mapping database associated with other extended fingerprint. Reorientation may comprise rotating or "spinning" the perspective so that the same elements may be associated in the mapping database.

Physically-constrained radio maps may be generated from the mapping database after enough representative extended fingerprints have been recorded. More specifically, the extended fingerprints may be combined locally in the apparatus alone, or in combination with remotely located processing resources such as mapping servers, to create representative 2-D or 3-D feature maps of a particular location (e.g., building maps including floor/room/indoor area specificity). Scaling and projection corrections may be based on the visual elements extracted from the images, but once combined the scale factors, rotations, etc., may be normalized and corrected based on standards established in the mapping database. In accordance with at least one embodiment of the present invention, scaling and/or reorientation-related processes may occur in either the sensing apparatus (e.g., based on element information) in the mapping database (e.g., based on the extended fingerprints already stored in the database), or may occur in both entities as part of the overall sensing, element extraction and extended fingerprint storage processes.

In some instances feature-based maps may not be usable as indoor maps that are presentable to a user as there will probably be gaps, blind corners, etc., that may not be accurately recorded, but may still be useful for positioning purposes. In at least one example usage scenario, information sensed regarding the current surroundings of an apparatus may be compared to a physically-constrained radiomap that resides locally in the apparatus or remotely (e.g., in mapping servers). The results of the comparison may by used to approximate a relative (e.g., with respect to other local landmarks that may be near the current position of an apparatus) or absolute (e.g., based on a larger coordinate system such as global positioning measurements) position for apparatuses. Aside from just providing current position, physically constrained radiomaps may also be used for other applications like directing users to other areas within the structure. It may even be possible that enough element information is collected in the mapping database so that a map displayable to users may be compiled. Users may then be shown current apparatus position within the confines of the displayable map so that the users may visually relate their location to their immediate surroundings, to their desired objective location, etc.

It may be relatively easy to merge extended fingerprints into a mapping database relying on matching visual elements defined in the images when extracted element information is reported by only a single apparatus operating at a constant rate. However, problems may emerge when different apparatuses perform feature mapping at random times, at various locations and with variable groups of extracted elements. For example different objects may exist at a location at different times, and thus, differences in extended fingerprints corresponding to the same location may be unavoidable. Such variable conditions are not unexpected, especially when the various extended fingerprints are obtained through crowdsourcing. Problems may also occur based on a lack of differentiation. If a building does not have much visual differentiation (e.g., typical office buildings usually have the same interior design from floor to floor), it may be challenging to merge extended fingerprints by relying on extracted visual element alone.

At least one of proposed alternative for spatial "ambiguity" removal is through the use of other sensor information (e.g., WiFi measurements) to provide coarse position information for locating extended fingerprints. For example, mapping servers may receive extended fingerprints comprising wireless signal information from an apparatus. The mapping server may then receive extended fingerprints containing wireless signal information from another apparatus at a different time instant. Once the mapping database has a sufficient amount of entries, a server may start "mining" the DB. In accordance with at least one embodiment of the present invention, mining may be initiated by sorting and/or clustering extended fingerprint information according to wireless fingerprints (e.g., by linking any APs defined as elements) and may then analyze similarities and matches in visual elements, taken along with wireless signal information provided with the visual elements, in order to merge the extended fingerprints into a combined representation in a mapping database.

V. Example Extended Fingerprint Creation.

To this point the above disclosure has focused mainly on sensing visual information and extracting useful elements from this visual information for storage in a mapping database. This discussion touched briefly on the possibility of including other information, in association with the visual information, for aiding the usability of the extended fingerprint in various application (e.g., position determination). This concept, in accordance with at least one embodiment of the present invention, is explored in more detail below. For example, the visual information capture and extraction processes described above may be combined with various other sensing abilities that may exist in an apparatus to provide a more detailed representation of a particular location over time.

Examples of apparatuses that are usable for implementing various embodiments of the present invention are disclosed in FIG. 1-3. In particular, FIG. 3 discloses that, in addition to visual sensing resources like cameras, apparatuses may comprise various other sensors for detecting wireless communication signals, magnetic and electromagnetic field strength, etc. In many existing applications these sensors are used to configure wireless communication, such as in the detection of proximate apparatuses (e.g., access points) and in avoiding potential sources of interference.

Further to the various interfaces 106 disclosed in FIG. 2-3, many apparatuses also comprise sensors that detect activity related to the apparatus itself. For instance, many wireless handsets now comprise resources for the detection of motion, direction, acceleration, etc. While apparatus-focused sensors have traditionally been utilized for supporting automated operations, such as triggering power saving modes when the apparatus is presumed to be in an inactive state, the growing popularity of games and other entertainment-related applications that base control on apparatus movement has the functionality more prevalent. Various example implementations of the present invention may utilize such apparatus-related sensing resources to provide control and additional information to further refine the positioning provided by extended fingerprints.

FIG. 5A-7 have disclosed processes, in accordance with at least one embodiment of the present invention, for capturing visual information and extracting useful element from the visual information for inclusion in an extended fingerprint. Now referring to FIG. 8, an example scenario is disclosed that leverages these visual processes along with other sensing abilities in an apparatus for fingerprint creation and assembly. While the interior of a structure (e.g., building hallway 800) has been used as an example in FIG. 8, the various embodiments of the present invention are not limited specifically to this application, and may be implemented wherever position determination functionality may be needed. Hallway 800 may be traversed by an apparatus moving from one end to the other. For example, a user holding the apparatus may walk along hallway 800. As the apparatus is moved in this manner, at subsequent instances in time activities may be carried out such as information collection, processing and storage in accordance with at least one embodiment of the present invention.

Figure 8:
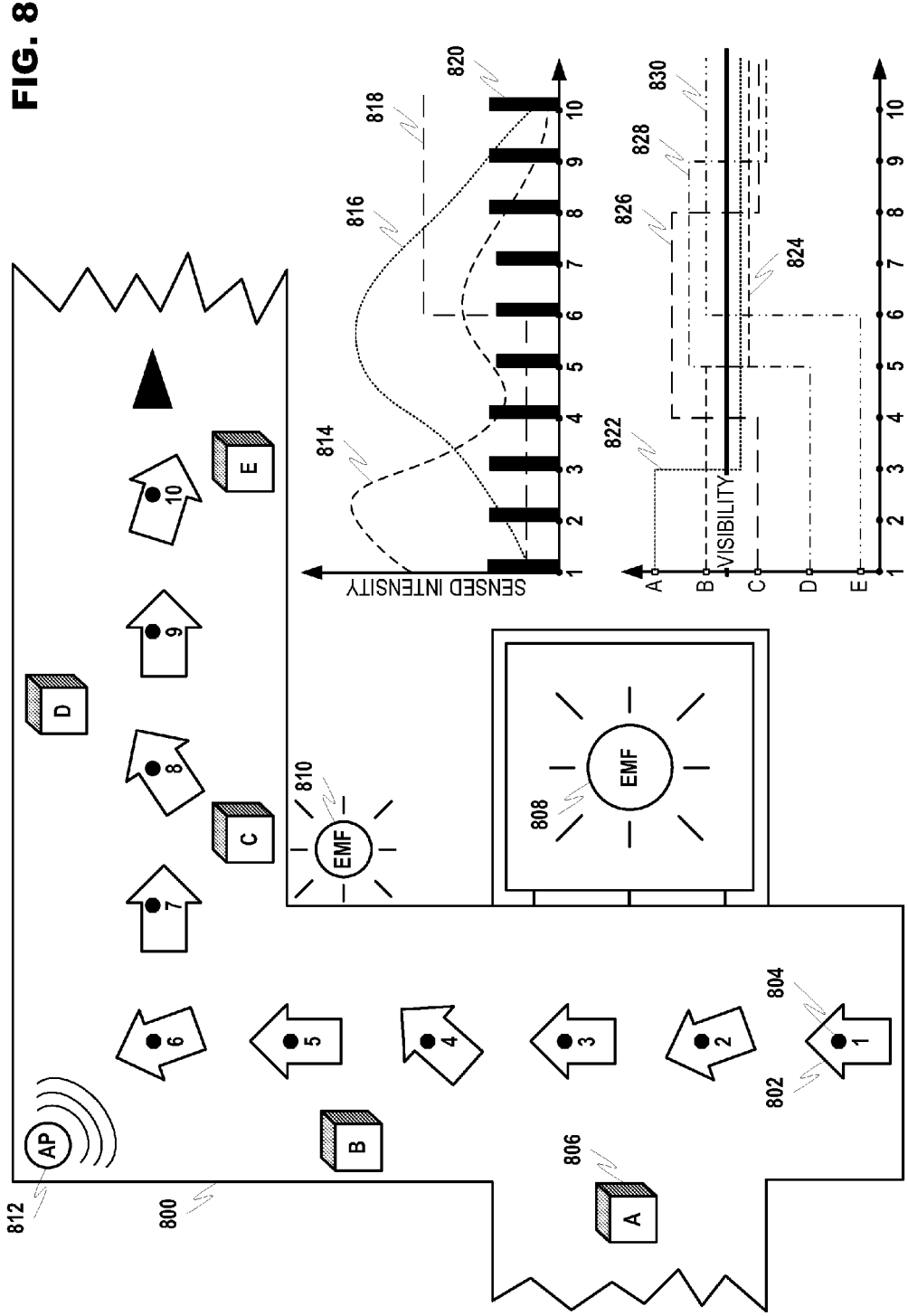
FIG. 8 discloses an example of other information that may be sensed and stored in an extended fingerprint in accordance with at least one embodiment of the present invention.

In the example of FIG. 8 the apparatus begins at arrow 802 in the oriented in the direction defined by the arrow. If the apparatus is equipped with apparatus-related resources such as motion sensors, acceleration sensors, directional sensors, etc., then the apparatus may record some or all of these characteristics. The movement of the apparatus through hallway 800 may then be characterized in a series of time instances 804 which make up an extended fingerprint. Extended fingerprints may then be combined (e.g., in a mapping database) in order to create a representation of hallway 800 and/or other internal areas of a structure. In the example of FIG. 8 there are a total of ten (10) time instances in the example extended fingerprint, but this number may vary depending on factors such as time instance/sensing activity triggering methods, apparatus capabilities, mapping system configuration, etc. Collection activities that may be associated with the creation of time instances may comprise sensing apparatus and/or location information, processing and/or correlating the sensed information, and storing the processed/correlated information as a time instance in an extended fingerprint. Extended fingerprints may then be associated together in a mapping database based on common attributes/elements.

In accordance with at least one embodiment of the present invention, an extended fingerprint may be composed of multiple instances where information is sensed, and the time at which each instance is sensed may be utilized to scale the information so that it may be combined in the extended fingerprint. The triggering of sensing may occur in various ways. For example, sensing may occur periodically. Periodic operation may provide sensed information that is evenly spaced in time, but that is not evenly spaced in distance within the location because a user may not traverse hallway 800 at a constant pace. Thus, the time information may be utilized to correlate the sensed information so that, for example, the scale may remain constant between time instances in an extended fingerprint. Sensing may also be triggered in other ways, such as based on motion sensed in the apparatus, manually, etc. Regardless of how sensing is triggered, various sensors may be activated as a result. For example, if sensed motion, acceleration, or change in apparatus orientation is detected, this information may be recorded. If vision sensing resources are available (e.g., a camera) then visual information such as video stream or still image information may be recorded. One or more visual elements may be extracted from sensed visual information such as disclosed in previously with respect to FIG. 5A-7.

If wireless sensing resources are available, signal and/or field information may be sensed at instances in time and added to extended fingerprints. Wireless sensing may take multiple forms in apparatuses. Wireless communication resources utilized for transmitting and/or receiving data in the apparatus may also be employed for detecting electromagnetic signals, and information related to any detected wireless signals may be recorded various instances in time. For example, not only may access points (AP) in the location be identified in the course of normal wireless operation, but the strength of the signal may also be sensed and recorded. This information may be correlated with other types of information in the same time instance, with other time instances in an extended fingerprint or with other extended fingerprints in a mapping database. Apparatuses may also possess resources for sensing magnetic fields. For example, in recording magnetic fields and using them as part of an extended fingerprint a "base" field is derived from the Earth's magnetic field may be altered by disturbances such as wireless communication, machinery, metallic structures, etc. These disturbances may make the base field unique at different locations, and make sensing magnetic field information helpful for positioning.

FIG. 8 discloses an example of the above processes as follows. At time instance "1" object A 806 may be visible and a particular magnetic field may exist based on localized field 808 created due to motor/power equipment associated with an elevator. The impact of localized magnetic field 808 is represented in graph 814 which shows a certain intensity (Y-axis) at time instance 1 (X-axis). Further, graph 822 shows object A 806 (Y-axis) as being visible (e.g., above the "VISIBILITY" line) at time instance 1 (X-axis). In this manner, visual information associated with a location (e.g., a time instance in an extended fingerprint) may be associated with sensed magnetic field information.

However, more information may be available. Access point (AP) 812 may be present in hallway 800. The signal strength of AP 812 is shown in graph 816, and this information may be recorded at various time instances in an extended fingerprint, along within current apparatus direction sensing (if available) such as shown in graph 818. As each subsequent time instance is triggered in FIG. 8, observed differences that are sensed in hallway 800 becomes apparent. For example, object A may be visible in extended fingerprints 1 and 2, but then become invisible (go out of sight) in fingerprints 3-10. The intensity of electromagnetic field source 800 peaks between time instances 2 and 3 and then drops in subsequent time instances, which may alter the disposition of the magnetic field sensed at these instances. The sensed magnetic field may continue to evolve when secondary source 810 is encountered around time instances 5 and 6. Direction graph 818 may remain relatively constant, despite some variation in the orientation of the apparatus, until time instance 6 where a substantial change in direction is observed. In this manner, the actual direction of the apparatus may be filtered or taken into account. For example, the direction of the apparatus may be filtered in order to account for a user walking down hallway 800. On the other hand, the direction of the apparatus may be taken into account when recording the visibility of objects A-E in subsequent time instances.

For example, object B may be visible at time instances 3 and 4 per graph 824 even though the orientation of the apparatus shown in FIG. 8 may not actually bring object B into the captured image frame. Sensed information may be adjusted to correct for extenuating factors as a part of correlating of one form of sensed information with other forms of information sensed at the same instance in time, as a result of corrections provided via crowd sourcing, etc. Such corrective activities may also be implemented for sensing objects C-E at time instance 6, where objects C-E may not be recorded as visible though they arguably "could" be visible based on apparatus orientation. Graphs 826-830 pertain to objects C-E, respectively, and reflect that objects "should" be visible based on user-submitted corrections or other corrective algorithms employed during information processing. As disclosed in FIG. 8, graphs 826-830 do shown that objects C-E should all be visible in time instance 6, while object C is not visible after time instance 7, object D is not visible after time instance 8, and object E is still visible even after time instance 10.

In accordance with at least one embodiment of the present invention, the information sensed at instances in time may be correlated. Correlation may take many forms. For example, motion (e.g., direction, position, acceleration, etc.) may be sensed at various time instances. Timing information may be determined by simply determine the change in time from one instance to a subsequent instance. Sensed motion information may be evaluated in view of the timing information in order to determine a "step" size. Example step size graph 820 discloses a calculated distance traversed by an apparatus from the previous time instance. The steps calculated at time instances 5-7 are shorter in graph 820 as the user of the apparatus was turning a corner in hallway 800. Step size may be further used to provide dimension or scaling to visual elements extracted from visual information. For example, the dimensions, position, orientation, etc. of visual elements may be determined based on step size. This information may also be used to adjust the scale of information recorded at an instance in time in order to store this information in association with previously stored information corresponding to previous time instances in the same extended fingerprint. After completion of correlation processes such as set forth above, information sensed at a time instance may then be referred to as correlated information.

Information sensed for an attribute of a location in one form may also be correlated with information sensed for the same attribute in another form. For example, AP 812 may be identified based on communication activity and communication strength or intensity information may also be sensed. This information may be correlated in order to link the identification of AP 812 to the sensed signal intensity at a particular instance in time. In accordance with at least one embodiment of the present invention, the signal strength information may be further processed in order to approximate a distance from the sensing apparatus to AP 812 at an instance in time. This may help to determine apparatus position, or if AP 812 is "visibly" sensed in hallway 812, it may further be extracted as a visual element from the recorded image information in at least time instances 5 and 6. Part of the correlation may therefore include associating the extracted visual element of AP 812 in time instances 5 and 6 with the signal and/or identification information sensed for AP 812. Such association may, for example, allow distances determined during the processing of the sensed signal information to be applied to the sensed visual information for determining a distance/size scale for extracted visual elements.

Graphs 814-820 and 822-830 in FIG. 8 discloses examples of extended fingerprint information accumulated over time. Extended fingerprints may be associated with other extended fingerprints in mapping databases to form a representation of an area such as the interior of a structure. Each time instance may be sensed, processed and then stored in association with previous time instances to form extended fingerprints that may be further associated in a mapping database in order to create the graphical relationships such as disclosed in FIG. 8.

It is important to note that part of the accumulation of information into mapping databases may comprise the association of features that are sensed/detected in one extended fingerprint with the same features in other extended fingerprints. Therefore, determining whether attributes observed in a location already exist in a mapping database may precede storing new extended fingerprint information in the mapping database. For example, this process may involve first searching the mapping database for the same (or similar) visual elements as contained in an extended fingerprint to be stored. If prior to storing new extended fingerprint information an apparatus identifies substantially similar information already in the mapping database, then the new information may be utilized to update or refine the information already stored in the mapping database. If some information to be stored is identical to information stored in the database, but other parts of the information in the same extended fingerprint are substantially different, corrective actions may initiate to determine if the new information or the existing information is invalid. If none of the attributes sensed in a new extended fingerprint can be identified in the mapping database, then the extended fingerprint may correspond to a new location in the mapping database.

Figure 9:
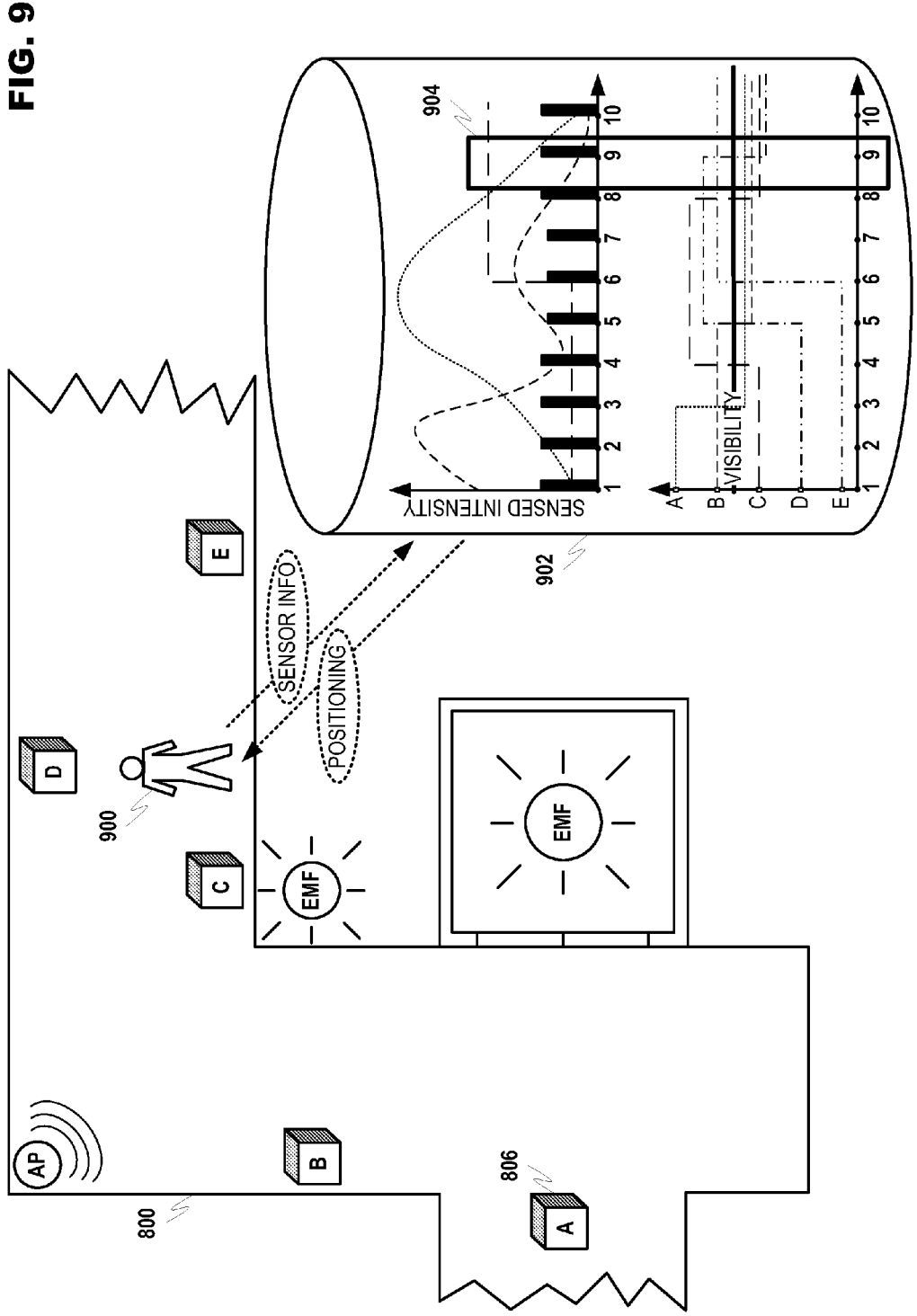
FIG. 9 discloses an example use of previously stored extended fingerprint information in accordance with at least one embodiment of the present invention.

An example of how extended fingerprint information may be utilized is disclosed in FIG. 9. User 900 may be present somewhere in hallway 800. User 900 may be implementing positioning or mapping functionality on an apparatus. For example, the apparatus of user 900 may execute applications that provide textual location/coordinate information, that graphically display the location of the user within hallway 800 or point out a direction towards an objective, etc. As part of this process, the apparatus of user 900 may send sensor information to mapping database 902. The sensor information may be collected, for example, by an application in the apparatus triggering collection. This collection may occur periodically in order to update the current position of the apparatus, may occur as a result of user interaction, etc. Regardless of how information sensing is triggered, the apparatus may provide sensed information to mapping database 902.

Mapping database 902 may reside wholly, or in part, within the apparatus. Other configurations are also possible where some or all of mapping database 902 resides remotely and is accessible, for example, through short-range (e.g., WLAN or Bluetooth) or long-range (e.g., cellular) communication. In the instance where a mapping database resides exclusively on the apparatus, extended fingerprint information may be collected exclusively by the apparatus, which may make the association of new information with existing information in mapping database 902 easier (e.g., since less correlation may be necessary). However, this would also limit the extended fingerprint information provided to mapping database 902 to only places where the particular apparatus, and by extension user 900 has been, limiting the usefulness of the information in the database. A remotely maintained mapping database 902 may allow for information to be collected from many contributors (e.g., crowd-sourced information), allowing users to access to mapping databases for locations they have not yet visited. Of course, collecting information from many different sources would necessitate more data handling such as the correlation of sensed information and revision of duplicate information provided by multiple sources.

Regardless of whether mapping database 902 exists solely on apparatus 900 or in conjunction with remotely stored resources, the sensor information provided by the apparatus in FIG. 9 may be evaluated in view of similar types of sensor information in mapping database 902. More specifically, sensed apparatus-related information (e.g., motion/acceleration/direction information), visual information, signal information (e.g., including sensed electromagnetic and magnetic field information), etc. may be compared to similar types of information stored in mapping database 902. Similar values may be attributed to an approximate location, and relative and/or absolute position information stored in mapping database 902 for the location may be usable for positioning in the apparatus. As shown in FIG. 9, this sensor information provided by the apparatus may correspond to a location associated with time instance 9. Location information associated with the time instance may then be provided back to the application/apparatus, and the application may be able to provide relative and/or absolute position information to user 900 based on the information provided by mapping database 902.

Figure 10:
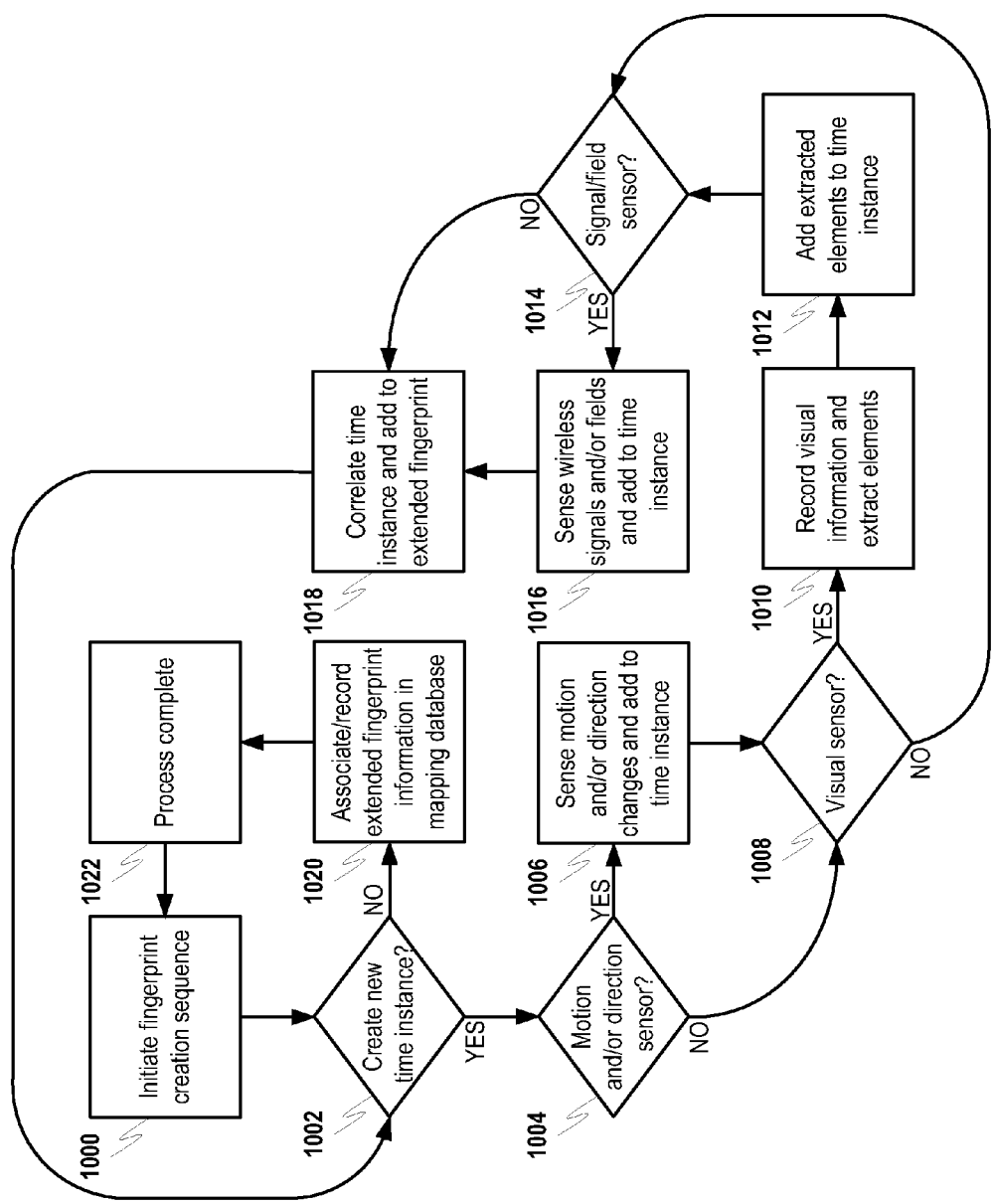
FIG. 10 discloses a flowchart for an example sensed information recording and storage process in accordance with at least one embodiment of the present invention.

In accordance with at least one embodiment of the present invention, a flowchart of an example process for information collection, processing and storage, is disclosed in FIG. 10. A new fingerprint creation sequence may initiate in step 1000. In step 1002 a determination may be made as to whether to create a new time instance for the extended fingerprint. If a new time instance should be created, then in step 1004 a determination may be made as to whether motion and/or direction sensing resource are available in the apparatus being utilized to create the time instance/extended fingerprint. Motion and/or direction sensing resources may comprise motion, direction, acceleration, etc. sensors. If motion and/or direction sensors are present, then in step 1006 information (e.g., motion, acceleration, directional changes) may be sensed using these sensors, and the sensed information may be added to the time instance.

The process may then proceed, either from a determination that no motion and/or direction sensors exist in step 1004 or from step 1006, to step 1008 where a determination may be made as to whether the apparatus contains visual sensing resources. Visual sensing resources may comprise a camera configured to capture video of still images. If the visual sensing resources are available, in step 1010 visual information for the location may be sensed and one or more visual elements may be extracted from the sensed visual information. For example, physical elements of the location that are definable in the captured image information may be extracted in order to form one or more visual elements. The extracted element information may then be added to the time instance in step 1012. The process may then proceed from a determination that no visual sensing resources exist in step 1008, or from the conclusion of step 1012, to step 1014 where a determination may be made as to whether signal and/or field sensing resources are available in the apparatus. Such resources may comprise transceiver resources for sensing and receiving electromagnetic communication signals and/or magnetic field sensors. If signal and/or field sensing resources are available in step 1014, then in step 1016 this information may be sensed and added to the time instance. While not shown, part of this process may include the identification of the source of communication signals, which may be associated with the signal strength sensed for each corresponding signal.

Regardless of whether the determination that no signal and/or field sensing resources are available in step 1014 or at the conclusion of step 1016, the process may then proceed to step 1018 where the information in the time instance may be correlated in step 1018. Correlation may include deriving time information based on the time instance in order to determine step distance, and using the step information to further determine scaling and/or dimensional information. The scaling and/or dimensional information, and possibly the sensed signal and/or field strength information, may be used to dimension, orient and/or position the visual elements extracted from the sensed visual information. When correlation is complete in step 1018, the correlated information may be stored in the extended fingerprint in association with stored information corresponding to previous time instances. Association may be based on, for example, the extracted visual elements in each time instance. The process may then return to step 1002 to determine if another time instance for the extended fingerprint should be created (e.g., repeat step 1004-1018). If no further time instances should be created, then in step 1020 the extended fingerprint may be stored in a mapping database, for example, in association with other extended fingerprints based on extracted visual element information in each extended fingerprint. The process may then be complete in step 1022 and may return to step 1000 to prepare for the initiation of the next extended fingerprint creation sequence.

While various exemplary configurations of the present invention have been disclosed above, the present invention is not strictly limited to the previous embodiments.

For example, the present invention may include, in accordance with at least one example embodiment, an apparatus comprising means for determining whether to initiate information sensing at an instance in time, wherein information sensing at the instance in time comprises means for, if the apparatus comprises motion sensing resources, sensing the motion of the apparatus and recording any sensed motion information, means for, if the apparatus comprises visual sensing resources, sensing visual information corresponding to a location, extracting visual elements from the sensed visual information and recording any extracted visual elements, means for if the apparatus comprises at least one of electromagnetic signal or magnetic field sensing resources, sensing at least one of signal or field information and recording any sensed signal or field information, means for correlating the motion information sensed at the instance in time, the extracted visual elements and the signal or field information sensed at the instance in time, and means for storing the correlated information corresponding to the instance in time in association with stored correlated information corresponding to previous instances in time.

At least one other example embodiment of the present invention may include electronic signals that cause apparatuses to determine whether to initiate information sensing at an instance in time, wherein information sensing at the instance in time comprises: if the apparatus comprises motion sensing resources, sense the motion of the apparatus and recording any sensed motion information, if the apparatus comprises visual sensing resources, sense visual information corresponding to a location, extracting visual elements from the sensed visual information and recording any extracted visual elements, if the apparatus comprises at least one of electromagnetic signal or magnetic field sensing resources, sense at least one of signal or field information and recording any sensed signal or field information, correlate the motion information sensed at the instance in time, the extracted visual elements and the signal or field information sensed at the instance in time, and store the correlated information corresponding to the instance in time in association with stored correlated information corresponding to previous instances in time.

Accordingly, it will be apparent to persons skilled in the relevant art that various changes in form a and detail can be made therein without departing from the spirit and scope of the invention. The breadth and scope of the present invention should not be limited by any of the above-described example embodiments, but should be defined only in accordance with the following claims and their equivalents.

What is claimed:

1. A method, comprising:
   determining in an apparatus whether to initiate information sensing at an instance in time, wherein information sensing at the instance in time comprises:
   performing at least two of: (1) sensing the motion of the apparatus and recording the sensed motion information; (2) sensing visual information corresponding to a location, extracting visual elements from the sensed visual information and recording the extracted visual elements; and (3) sensing at least one of electromagnetic signal and magnetic field information and recording the at least one of sensed signal and field information;
   correlating at least two of the sensed motion information, the extracted visual elements and the at least one of sensed signal and field information to generate correlated sensed information corresponding to the instance in time; and
   storing the correlated sensed information corresponding to the instance in time in association with stored correlated sensed information corresponding to previous instances in time.

2. The method of claim 1, wherein sensing the motion of the apparatus comprises sensing at least one of direction, motion and acceleration.

3. The method of claim 1, wherein sensing visual information comprises sensing at least one of video and still image information.

4. The method of claim 3, wherein extracting visual elements from the sensed visual information comprises defining one or more physical features of the location from the at least one of video and still image information.

5. The method of claim 1, wherein correlating at least two of the sensed motion information, the extracted visual elements and the at least one of sensed signal and field information comprises calculating dimensions by evaluating the sensed motion information in view of time information based on the instance in time.

6. The method of claim 5, wherein correlating at least two of the sensed motion information, the extracted visual elements and the at least one of sensed signal and field information further comprises determining one or more of orientation, dimension and position for the extracted visual elements based on the at least one of sensed signal and field information and the calculated dimensions.

7. The method of claim 1, wherein the correlated sensed information corresponding to the instance in time is associated with stored correlated sensed information corresponding to previous instances in time based at least on the extracted visual elements.

8. A computer program product comprising computer executable program code recorded on a non-transitory computer readable storage medium, the computer executable program code comprising:
   code configured to cause an apparatus to determine whether to initiate information sensing at an instance in time, wherein code for causing the apparatus to perform information sensing at the instance in time further comprises:

code configured to cause the apparatus to perform at least two of: (1) sensing the motion of the apparatus and recording the sensed motion information; (2) sensing visual information corresponding to a location, extracting visual elements from the sensed visual information and recording the extracted visual elements; and (3) sensing at least one of electromagnetic signal and magnetic field information and recording the at least one of sensed signal and field information;

code configured to cause the apparatus to correlate at least two of the sensed motion information, the extracted visual elements and the at least one of sensed signal and field information to generate correlated sensed information corresponding to the instance in time; and code configured to cause the apparatus to store the correlated sensed information corresponding to the instance in time in association with stored correlated sensed information corresponding to previous instances in time.

9. The computer program product of claim 8, wherein sensing the motion of the apparatus comprises sensing at least one of direction, motion and acceleration.

10. The computer program product of claim 8, wherein sensing visual information comprises sensing at least one of video and still image information.

11. The computer program product of claim 10, wherein the code configured to cause the apparatus to extract visual elements from the sensed visual information further comprises code configured to cause the apparatus to define one or more physical features of the location from the at least one of video and still image information.

12. The computer program product of claim 8, wherein the code configured to cause the apparatus to correlate at least two of the sensed motion information, the extracted visual elements and the at least one of sensed signal and field information further comprises code configured to cause the apparatus to calculate dimensions by evaluating the sensed motion information in view of time information based on the instance in time.

13. The computer program product of claim 12, wherein the code configured to cause the apparatus to correlate at least two of the sensed motion information, the extracted visual elements and the at least one of sensed signal and field information further comprises the code configured to cause the apparatus to determine one or more of orientation, dimension and position for the extracted visual elements based on the at least one of sensed signal and field information and the calculated dimensions.

14. The computer program product of claim 8, wherein the correlated sensed information corresponding to the instance in time is associated with stored correlated sensed information corresponding to previous instances in time based at least on the extracted visual elements.

15. An apparatus, comprising:
at least one processor; and
at least one memory including executable instructions, the at least one memory and the executable instructions being configured to, in cooperation with the at least one processor, cause the apparatus to perform at least the following:
determine whether to initiate information sensing at an instance in time, wherein information sensing at the instance in time comprises:
performing at least two of: (1) sensing the motion of the apparatus and recording the sensed motion information; (2) sensing visual information corresponding to a location, extracting visual elements from the sensed visual information and recording the extracted visual elements; and (3) sensing at least one of electromagnetic signal and magnetic field information and recording the at least one of sensed signal and field information;

correlate at least two of the sensed motion information, the extracted visual elements and the at least one of sensed signal and field information to generated correlated sensed information corresponding to the instance in time; and store the correlated sensed information corresponding to the instance in time in association with stored correlated sensed information corresponding to previous instances in time.

16. The apparatus of claim 15, wherein the apparatus further comprises motion sensing resources comprising at least one of directional, motion and acceleration sensors.

17. The apparatus of claim 15, wherein the apparatus further comprises visual sensing resources comprising a camera and the visual information is at least one of video and still image information.

18. The apparatus of claim 17, wherein the at least one memory and the executable instructions being configured to, in cooperation with the at least one processor, cause the apparatus to extract visual elements from the sensed visual information further comprises the at least one memory and the executable instructions being configured to, in cooperation with the at least one processor, cause the apparatus to define one or more physical features of the location from the at least one of video of and still image information.

19. The apparatus of claim 15, wherein the at least one memory and the executable instructions being configured to, in cooperation with the at least one processor, cause the apparatus to correlate at least two of the sensed motion information, the extracted visual elements and the at least one of sensed signal and field information further comprises the at least one memory and the executable instructions being configured to, in cooperation with the at least one processor, cause the apparatus to calculate dimensions by evaluating the sensed motion information in view of time information based on the instance in time.

20. The apparatus of claim 19, wherein the at least one memory and the executable instructions being configured to, in cooperation with the at least one processor, cause the apparatus to correlate at least two of the sensed motion information, the extracted visual elements and the at least one of sensed signal and field information further comprises the at least one memory and the executable instructions being configured to, in cooperation with the at least one processor, cause the apparatus to determine one or more of orientation, dimension and position for the extracted visual elements based on the at least one of sensed signal and field information and the calculated dimensions.

21. The apparatus of claim 15, wherein the correlated sensed information corresponding to the instance in time is associated with stored correlated sensed information corresponding to previous instances in time based at least on the extracted visual elements.

* * * * *